(12) United States Patent
Su

(10) Patent No.: US 8,049,978 B1
(45) Date of Patent: Nov. 1, 2011

(54) ASSEMBLING STRUCTURE FOR A MAGNIFYING GLASS

(76) Inventor: Cheng-Wei Su, Taichung (TW)

( * ) Notice: Subject to any disclaimer, the term of this patent is extended or adjusted under 35 U.S.C. 154(b) by 0 days.

(21) Appl. No.: 13/011,900

(22) Filed: Jan. 22, 2011

(51) Int. Cl.
 *G02B 7/02* (2006.01)
(52) U.S. Cl. ......... 359/819; 359/811; 359/820; 359/825
(58) Field of Classification Search ............... 359/802, 359/811, 819, 820, 825, 827, 707; 396/509, 396/510; 362/335, 337, 338; 353/100, 101; 451/460
See application file for complete search history.

(56) References Cited

U.S. PATENT DOCUMENTS

| | | | | | |
|---|---|---|---|---|---|
| 3,187,582 | A | * | 6/1965 | Perkins et al. ................. | 73/431 |
| 3,695,280 | A | * | 10/1972 | Sturgeon .................... | 134/166 R |
| 5,249,082 | A | * | 9/1993 | Newman ........................ | 359/813 |
| 6,567,224 | B2 | * | 5/2003 | Hatakeyama et al. ........ | 359/819 |
| 6,665,132 | B2 | * | 12/2003 | Hendriks et al. ............... | 359/819 |
| 6,900,953 | B2 | * | 5/2005 | Okumura ...................... | 359/819 |
| 7,079,332 | B2 | * | 7/2006 | Tanaka ......................... | 359/822 |
| 7,218,462 | B2 | * | 5/2007 | Sudoh ........................... | 359/811 |
| 7,342,732 | B2 | * | 3/2008 | Dang et al. .................... | 359/819 |
| 7,471,470 | B2 | * | 12/2008 | Kuroda ......................... | 359/811 |
| 7,529,046 | B2 | * | 5/2009 | Schletterer et al. ........... | 359/819 |

* cited by examiner

*Primary Examiner* — Loha Ben

(57) ABSTRACT

An assembling structure for a magnifying glass comprises a magnifying lens element and an annular lens frame. The annular lens frame is formed with a through assembling hole and provided with a guiding portion and a stopping portion. In an inner surface of the annular lens frame is formed an engaging groove. The guiding portion and the stopping portion are located at two opposite sides of the engaging groove. The annular lens frame is made of polypropylene. After being heated, the polypropylene-made annular lens frame can be softened slightly and enhanced in terms of elasticity, so that the magnifying lens element can be placed from the guiding portion and engaged into the engaging portion. By such an arrangement, the installation of the magnifying lens element in the annular lens frame is simple, quick, labor-saving and stable.

1 Claim, 4 Drawing Sheets

ASSEMBLING STRUCTURE FOR A MAGNIFYING GLASS

BACKGROUND OF THE INVENTION

1. Field of the Invention

The present invention relates to a magnifying glass, and more particularly to an assembling structure for a magnifying glass.

2. Description of the Prior Art

A conventional magnifying glass normally consists of a magnifying lens element which is directly adhered in a lens frame or the lens element is fixed therein in a snap-fit manner.

The adhering method includes applying adhesive in an engaging groove in the lens frame, installing the lens element in the engaging groove, cleaning away the unwanted or overflow adhesive, and finally waiting for a period of time until the adhesive dries. Hence, it can be found that the adhering method is too complicated and time-consuming.

The snap-fit method can simplify the fixing process and save time, but if the lens frame is made of material having a relatively small elasticity, it needs to apply a relatively great force to press the lens element into the engaging groove of the lens frame during the installation of the lens element. Hence, it can be found that such a snap-fit method is laborsome and prone to causing the fracture of the lens element. If the lens frame is made of material having better elasticity, the lens element is easy to fall off due to clearance, although it can be installed on the lens frame easily.

The present invention has arisen to mitigate and/or obviate the afore-described disadvantages.

SUMMARY OF THE INVENTION

The primary objective of the present invention is to provide an assembling structure for a magnifying glass comprising a magnifying lens element and an annular lens frame. The annular lens frame is formed with an annular engaging groove around an inner surface of the annular lens frame and provided with a guiding portion and a stopping portion. The annular lens frame is made of polypropylene. After being heated, the polypropylene-made annular lens frame can be softened slightly and enhanced in terms of elasticity, so that the magnifying lens element can be placed from the guiding portion and engaged into the engaging portion. By such an arrangement, the installation of the magnifying lens element in the annular lens frame is simple, quick, labor-saving and stable.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
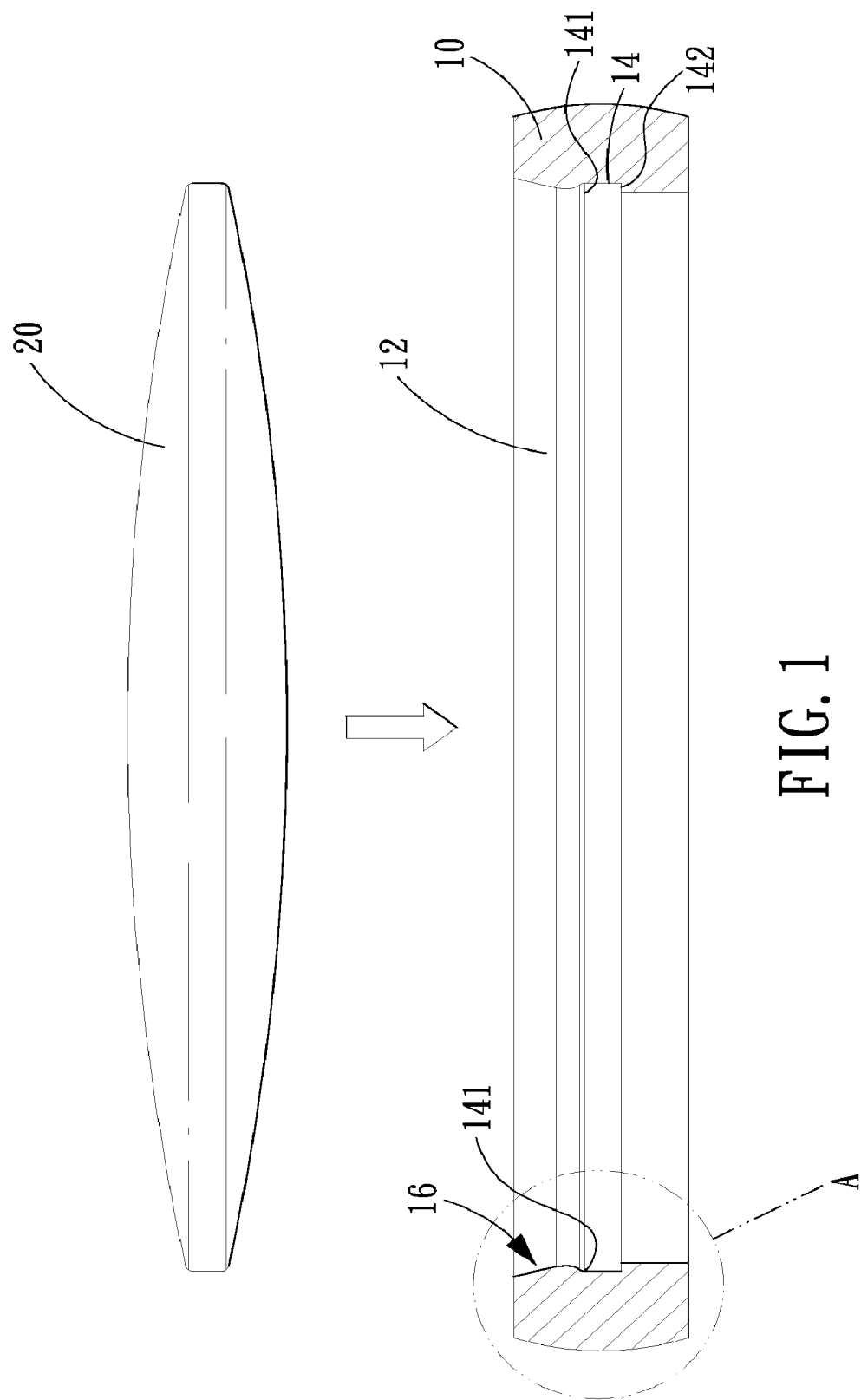
FIG. 1 is an operational view of an assembling structure for a magnifying glass in accordance with the present invention, showing how a magnifying lens element is assembled in an annular lens frame.

Referring to FIG. 1, an assembling structure for a magnifying glass in accordance with a preferred embodiment of the present invention comprises an annular lens frame 10 in which is fitted an engaging a magnifying lens element 20.

Figure 2:
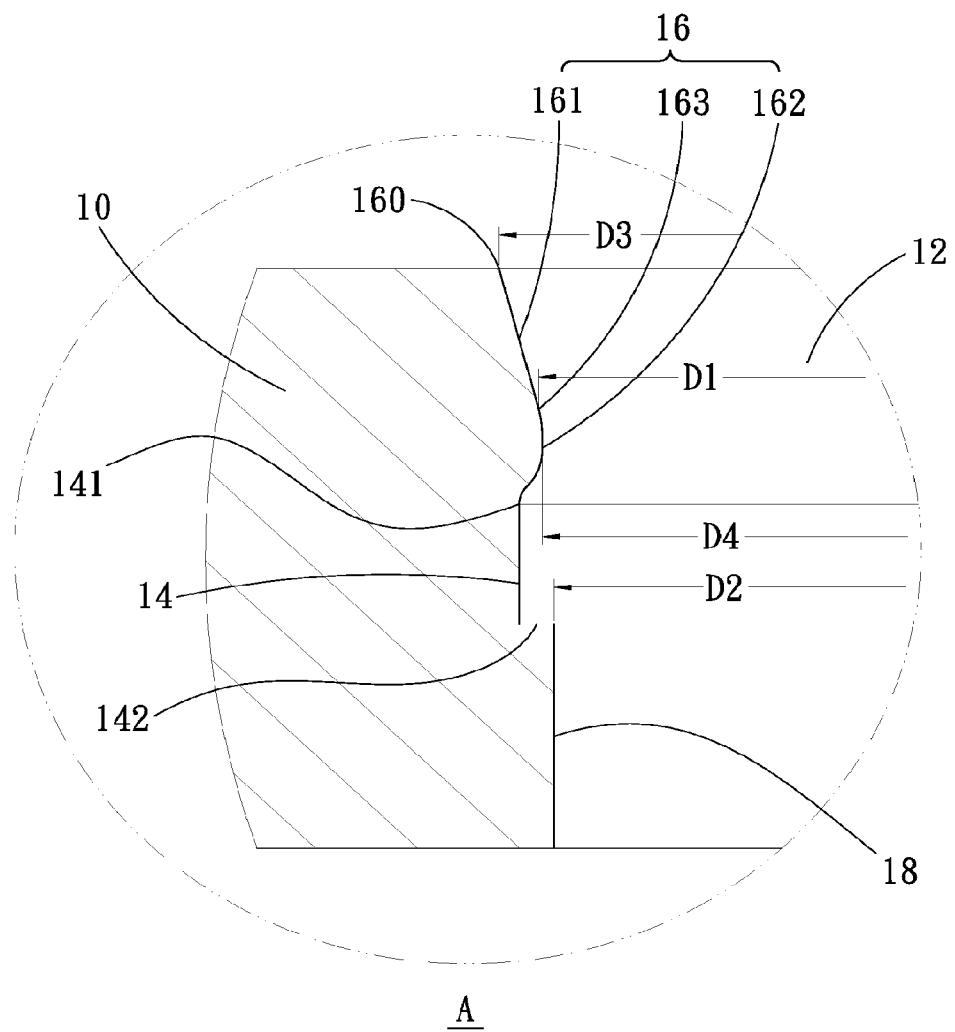
FIG. 2 is an enlarged view of the part A of FIG. 1.
Figure 3:
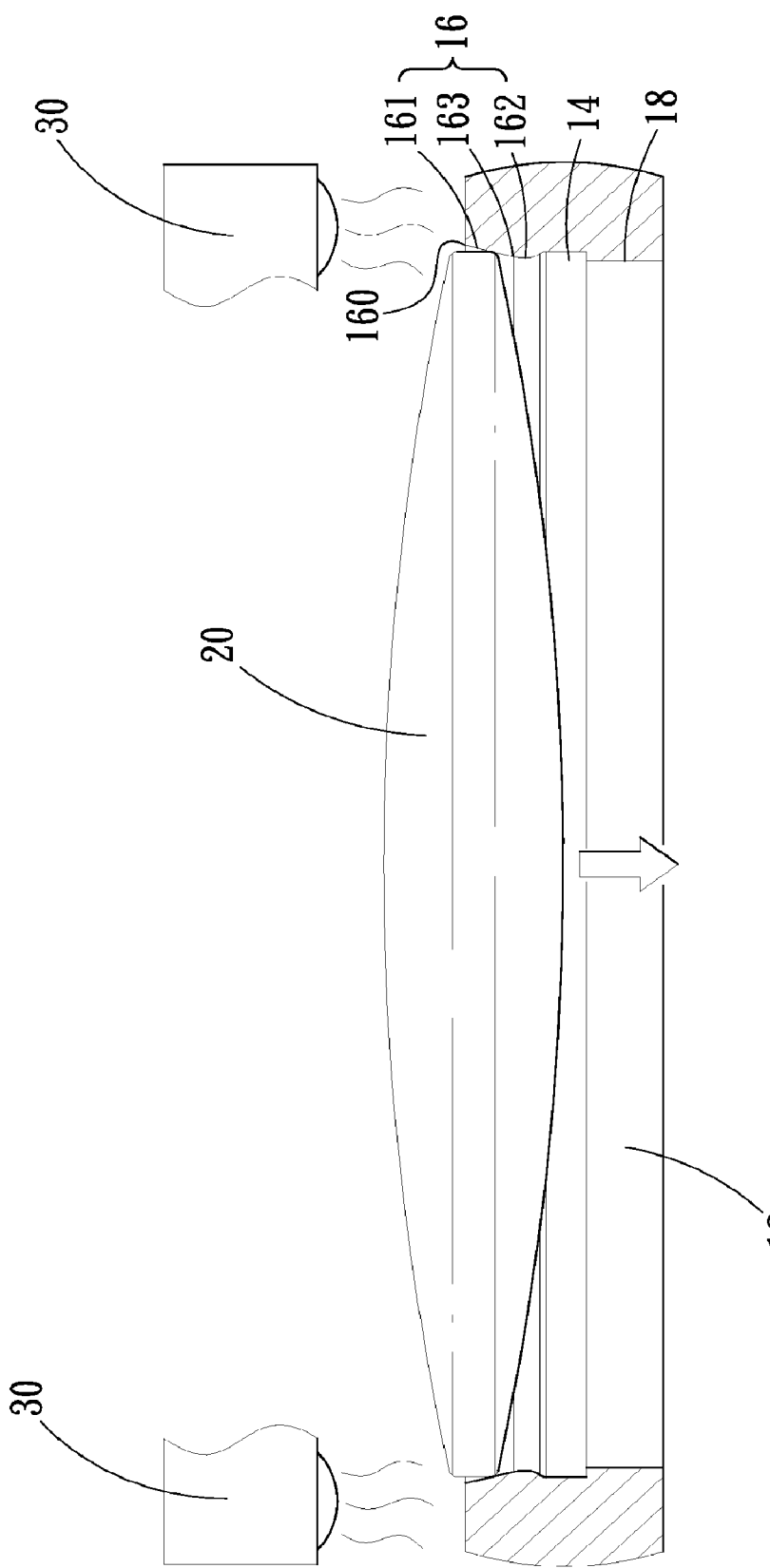
FIG. 3 is an operational view showing that the magnifying lens element is assembled in the annular lens frame which is heated.
Figure 4:
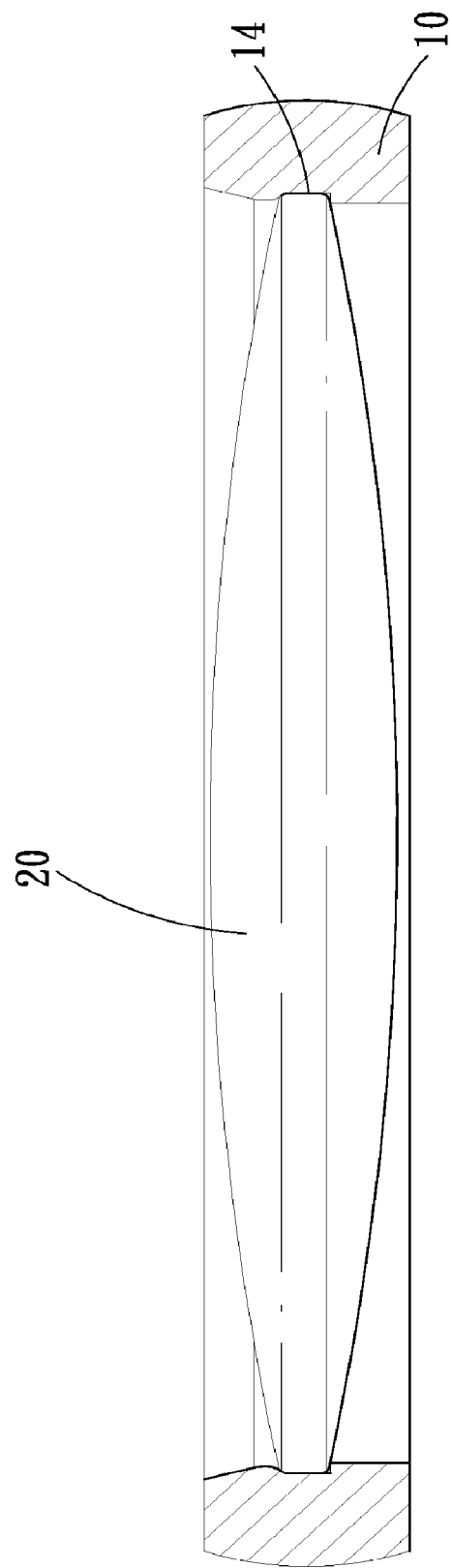
FIG. 4 is a cross sectional view in accordance with the present invention, showing that the magnifying lens element is assembled in the annular lens frame.

The annular lens frame 10 is formed with a through assembling hole 12, and an annular engaging groove 14 in an inner surface of the annular lens frame 10. The engaging groove 14 includes a first side 141 and a second side 142. A guiding portion 16 is obliquely formed on the inner surface of the annular lens frame 10 and abuts against the first side 141. A stopping portion 18 which abuts against the second side 142 of the engaging groove 14 and protrudes with respect to the engaging groove 14 is formed on the inner surface of the annular lens frame 10. Referring to FIG. 2, the guiding portion 16 includes an oblique section 161 and a curved section 162. The oblique section 161 includes a low point 160 and a high point 163 formed at two ends thereof respectively, and the low point 160 is located at the end of the oblique section 161 where the diameter D3 of the assembling hole 12 is larger than a diameter D1 of the assembling hole 12 at round the high point 163 which is located at another end of the oblique section 161. The high point 163 is connected to the curved section 162. The diameter D1 of the assembling hole 12 at round the high point 163 is larger than a diameter D2 of the assembling hole 12 at around the stopping portion 18, and a diameter D4 of the assembling hole 12 at around the curved section 162 is smaller than the diameter D1 of the assembling hole 12 at round the high point 163, as shown in FIGS. 2 and 3. Namely, the diameters of the assembling hole 12 satisfy the relation: D3>D1>D4>D2.

It is to be noted that, the annular lens frame 10 is made of polypropylene having elasticity. When the annular lens frame 10 is heated by a heating apparatus 30, the polypropylene-made annular lens frame 10 can be softened slightly and enhanced in terms of elasticity.

The magnifying lens element 20 can be smoothly placed in the assembling hole 12 from the guiding portion 16 after the annular lens frame 10 is softened slightly by heating, at this moment, the magnifying lens element 20 can be pushed over the curved section 162 into the engaging groove 14 by a smaller force, so that the magnifying lens element 20 is restricted therein by the stopping portion 18. Being made of polypropylene, the annular lens frame 10 will become soft when heated and will become hard again when cooled without deformation, in other words, the peripheral edge of the magnifying lens element 20 can be stably engaged in the engaging groove 14 of the annular lens frame 10.

It is to be noted that, the guiding portion 16 consists of the oblique section 161 and the curved section 162, and with the guidance of the oblique portion 161, the magnifying lens element 20 can be assembled more easily.

Furthermore, since the curved section 162 has an arc structure, when the magnifying lens element 20 is brought into contact with the curved section 162, it can reduce wear of the curved section 162.

While we have shown and described various embodiments in accordance with the present invention, it is clear to those skilled in the art that further embodiments may be made without departing from the scope of the present invention.

What is claimed is:

1. An assembling structure for a magnifying glass comprising:

an annular lens frame made of polypropylene and formed with a through assembling hole and an annular engaging groove, wherein the annular engaging groove is formed on an inner surface of the annular lens frame, and includes a first side and a second side; the annular lens frame further formed with an oblique guiding portion being configured on the inner surface to abut against the first side, and a stopping portion abutting against the second side and formed axially on the inner surface as a continuation from the engaging groove, wherein the guiding portion includes an oblique section and a curved section, the oblique section including a low point and a high point, with the low point located at an assembly entry end of the oblique section where a diameter (D3) of the assembling hole is larger than a diameter (D1) of the assembling hole at around the high point which is located at the starting point of the curved section, the diameter (D1) being larger than a diameter (D2) of the stopping portion, and a diameter (D4) of the assembling hole at around the curved section being smaller than the diameter (D1); and a polypropylene magnifying lens element placed in the assembling hole through the assembly entry end after the annular lens frame being softened by heating, slid along the oblique section, pushed over the curved section into the engaging groove, and restricted therein by the stopping portion, wherein the annular lens frame will become soft when heated and will become hard again when cooled without deformation.

\* \* \* \* \*